United States Patent [19]
Swearingen, Jr.

[11] Patent Number: 4,467,249
[45] Date of Patent: Aug. 21, 1984

[54] REMOTE AUTOMOBILE WINDOW CONTROL

[76] Inventor: Judson S. Swearingen, Jr., 27403 Pacific Coast Hwy., Malibu, Calif. 90265

[21] Appl. No.: 396,608

[22] Filed: Jul. 9, 1982

[51] Int. Cl.[3] .............................................. H02P 1/22
[52] U.S. Cl. .................................... 318/282; 318/286; 318/466; 318/16
[58] Field of Search ................ 318/466, 468, 445–446, 318/280–286, 16

[56] References Cited

U.S. PATENT DOCUMENTS

| | | | |
|---|---|---|---|
| 4,357,564 | 11/1982 | Deming et al. | 318/466 |
| 4,386,398 | 5/1983 | Mastsuoka et al. | 318/466 |
| 4,404,558 | 9/1983 | Yen | 318/466 |
| 4,408,146 | 10/1983 | Beckerman | 318/466 |

*Primary Examiner*—G. Z. Rubinson
*Assistant Examiner*—Arthur G. Evans
*Attorney, Agent, or Firm*—Lyon & Lyon

[57] ABSTRACT

Apparatus is provided by which a motor vehicle window can be raised and lowered remotely by the use of a unique circuit which interfaces with the motor provided in the vehicle for such purposes. A hand-held transducer, utilizing either radio frequency energy or ultrasonic energy, is used to provide a momentary signal which activates the circuitry, configured to respond to a first signal by causing the window to be completely lowered. Transmission of a second identical signal will begin to raise the window and will continue to do so only as long as the signal remains activated.

4 Claims, 4 Drawing Figures

REMOTE AUTOMOBILE WINDOW CONTROL

BACKGROUND OF THE INVENTION

This invention provides for the ability to raise and lower an automobile window from a remote location. The circuitry which controls the window motor is remotely activated by a signal from a hand-held control unit.

For a considerable time, automobile manufactuers have equipped their products with electric window mechanisms. Such mechanisms use a motor internal to the door assembly, activated by an up/down switch accessible to driver and passengers, to raise and lower the automobile windows in place of a hand-operated crank mechanically coupled to the window. Prior to this invention, remote operation of electrically powered automobile windows was unknown.

In recent years, law enforcement organizations including police departments and private security guard services, have utilized dogs in their efforts to curtail crime while operating from vehicles, either cruising on patrol or vectored to the site of possible trouble by radio messages from a dispatching center. In some instances, the dog handlers bring the dogs with them when they leave the automobile to investigate or go on patrol. In other instances it is desireable to leave the dogs in the vehicle until they are needed. In these latter instances valuable time is often lost, and in some cases the safety of the officer or the public is put at risk while the dog handler returns to the vehicle to release the dog.

SUMMARY OF THE INVENTION

The present invention is directed to a mechanism for advantageously actuating an electrically-controlled vehicle window for the purpose of releasing a dog by remote control from that vehicle. Through the mechanism of the present invention, the dog handler is freed from the problems of taking the dog into a situation where it may be inappropriate on the chance that the handler may be placed in a more inappropriate circumstance by having to leave his position to return and retrieve the dog. The present invention also provides simplified yet versatile control by the remote unit to insure against premature release of or injury to the dog.

The mechanism includes a hand-held control unit and is designed so as not to require alteration of the circuitry supplied by the manufacturer of the vehicle. Through the use of a single command button or switch, the window may be opened, closed or partially opened or closed. Further, the mechanism may be so arranged as to move the window in the same direction during the first closure of the command button or switch upon initial activation of the system.

Accordingly, it is an object of the present invention to provide remote, versatile and advantageous control over an electrically actuated vehicle window for the purpose of releasing a dog from that vehicle. Other and further objects and advantages will appear hereinafter.

DETAILED DESCRIPTION OF THE PREFERRED EMBODIMENT

Figure 1:
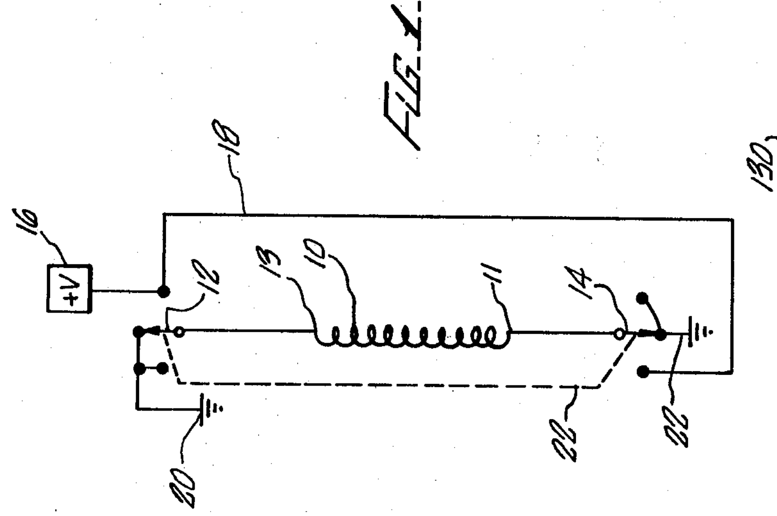
FIG. 1 depicts a typical arrangement employed within a vehicle to raise and lower electrically-operated windows.

Referring first to FIG. 1 a schematic diagram of a typical vehicle electric window system is depicted to show the environment in which the present invention operates.

A motor winding 10, having two ends 11 and 13, is the winding of a direct current (D.C.) motor which operates using power from the vehicle's battery to open and close a vehicle window. An up switch 12 and a down switch 14 act to raise and lower the window, respectively. When switches 12 and 14 are not activated, they hold both ends 11 and 13 of the motor winding 10 at ground potential.

Although the two switches 12 and 14 are shown as separate single pole double throw switches, those skilled in the art will recognize that they are built into the same assembly and are usually operated by a single actuator, designed to hold the wiper of one switch to ground while the other wiper is brought into contact with a source of D.C. voltage from the vehicle's electrical system. The source of D.C. voltage is depicted as a block 16 and is shown connected to the switches 12 and 14 via a line 18. The switches 12 and 14 have one of their poles connected to ground via a contact 20. A dashed line 22 represents the mechanical linkage between switches 12 and 14 discussed above which allows them to be placed in a single assembly and operate as disclosed.

It is to be understood that FIG. 1 represents the environment in which the present invention functions and is included only for facilitating an understanding of the operation of the invention, which connects electrically to this assembly. The overall operation of the invention can best be understood with reference to FIG. 2, a block diagram of the invention.

A remote, hand-held or similarly small batterypowered radio transmitter 100, such as may be used in a garage door opener and understood by those of ordinary skill in the art, is shown having an electrical push button switch 102 and an antenna 104. This unit 100 is carried by the dog handler wishing to activate the window and is designed to have an effective range suitable for the maximum distances over which it is contemplated that the system will be used.

Figure 2:
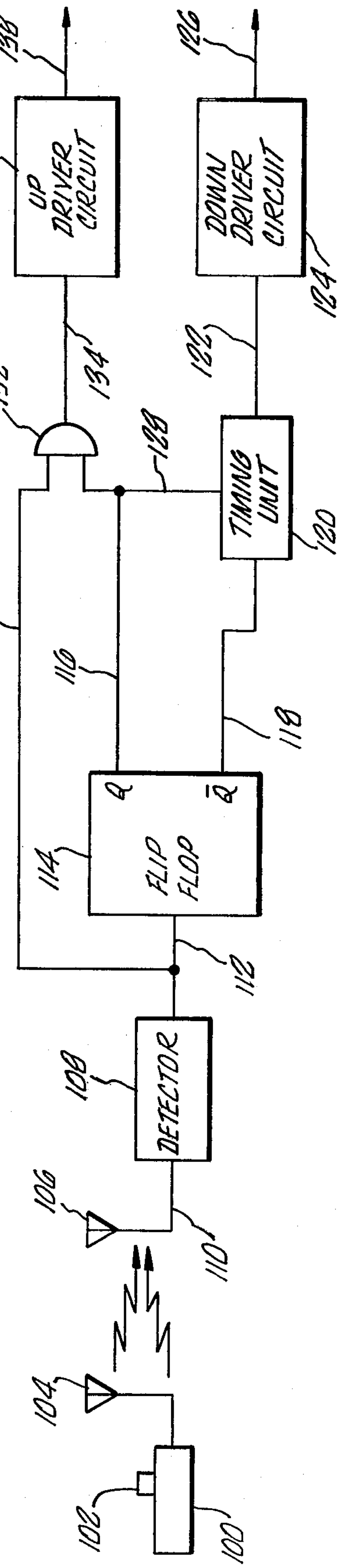
FIG. 2 is a block diagram of the present invention.

The remainder of the components of FIG. 2 are located in the vehicle in a convenient location. A radio antenna 106 is employed to receive a radio signal from the radio transmitter 100, which may be simply an unmodulated r.f. carrier frequency keyed by the button 102, or may be more complex for security or to avoid inadvertent spurious activation. Those skilled in the art will easily be able to implement such transmitting and receiving formats, which form no part of the present invention.

The radio frequency energy received by the antenna 106 is fed to a detector 108 via a line 110. The function of the detector 108 is to provide a binary indication at its output 112 indicative of whether a signal is being transmitted from the transmitter 100. If no signal is present, the output 112 of the detector 108 is deactivated and will assume one D.C. voltage level, and, if a signal is present, the output of detector 108 is activated and will assume a second, distinct D.C. voltage level, in the same manner that digital logic circuitry assumes two distinct logic states represented by distinct D.C. voltages. The output of the detector 108 is jitter and glitch free; that is, it is designed to provide clean transitions between voltage levels when a signal from the transmitter 100 begins or terminates.

The output 112 of the detector 108 drives a flip-flop 114. The flip-flop 114 is of the type commonly employed in the electronics industry. Upon sensing the leading edge of a voltage change at its input, the voltages comprising the logic states of its outputs which are always complementary to one another, the flip-flop changes state from one logic (and voltage) level to the other.

The flip-flop 114 is conditioned such that upon system power up, its outputs always assume a predetermined state. For purposes of this disclosure it is to be assumed that a higher voltage level is an on or activated state, and a lower voltage is an off or deactivated state. The voltage values assumed by these circuit elements will depend on the logic family and/or power supply voltages used and those of ordinary skill in the art will readily appreciate and understand how to implement circuitry with the correct parameters in view of the disclosure herein. Such persons will also appreciate that the voltage roles of the activated and deactivated states of the logic can be readily reversed with no effect on the operation of the invention. Upon power-up, the output Q of the flip-flop 114 through a line 116, will be activated, and output $\overline{Q}$, through a line 118, will be deactivated.

Operation of the system of FIG. 2 can be understood by examining the events which occur upon depression of the button 102 on control unit 100. When the button 102 is pressed, a signal from the control unit 100, via the transmitting antenna 104, the receiving antenna 106 and the line 110, arrives at the detector 108, thus activating its output. This causes the flip-flop 114, via the line 112, to change states, activating the $\overline{Q}$ output 118 and deactivating the Q output 116.

The $\overline{Q}$ output of the flip-flop 114 is connected via the line 118 to a timing unit 120. The state change of the flip-flop 114 which activates the $\overline{Q}$ output 116 causes the timing unit 120 to begin a timing cycle. Upon initiation of the timing cycle, the output of the timer 120, via a line 122, activates the down driver circuit 124. The output of the down circuit 124, via a line 126, supplies voltage to the motor winding 10 at its end 11 and the motor 10 lowers the window. The timing unit 120 is set to activate for the period of time necessary to lower the window from its totally upraised position and thus permits the window to be fully lowered from any position by a momentary depression of the button 102 on the control unit 100.

The lowering of the vehicle window can be stopped by the operator at any point so that the window may be lowered to any intermediate position under the control of the control unit 100. If, after the button 102 is depressed to start the lowering of the window, it is again depressed, the circuit of FIG. 2 causes the flip-flop 114 to change state as previously disclosed. This results in the output Q 116 to be activated and the output $\overline{Q}$ 118 to be deactivated.

When the output Q 116 of the flip-flop 114 is activated, it turns off the timing unit 120 via a line 128. If the button 102 has been momentarily depressed, the window merely stops in whatever position it was in when button 102 was depressed since the down driver circuit 124 is no longer activated by the timing unit 120.

If, however, the button 102 is continually depressed, not only will the lowering action of the window cease due to removal of voltage from the output of the down driver circuit 124 to the motor winding 10, but the window will begin to raise due to the following action. As long as the button 102 remains depressed, the output of the detector 108 remains activated. As shown in FIG. 2, the output of the detector 108, in addition to its connection to the toggle input to the flip-flop 114, is connected to one input to a gate 132 via line 130. The other input to the gate 132 is connected to the Q output 116 of the flip-flop 114 which the depression of the button 102 has activated. Since both inputs to the gate 132 have been enabled by the activated signals, the output of the gate 132 will be enabled.

By way of illustration, the gate 132 may be an AND gate of the type commonly employed in digital electronics. When both of its inputs are activated by signals having a "high" logic level, in this case the output 112 of the detector 108 and the Q output 116 of the flip-flop 114, its output becomes "high" or activated.

The output of the gate 132 is connected to the up driver circuit 136 via a line 134. When the gate 132 is enabled, it turns on the up driver circuit 136, which in turn, via a line 138, supplies voltage to the motor winding 10 at its end 13.

Because the voltages from the up and down driver circuits 136 and 124, respectively, are applied at opposite ends of motor winding 10, they cause the motor to turn in opposite directions since the motor is a D.C. motor.

Since, as is apparent from FIG. 1, the opposite ends 11 and 13 of the motor winding 10 are connected to ground when the switches 12 and 14 are not activated, some way must be devised to apply voltage to the motor windings without causing short circuits to ground in order for the invention to operate. The composition of the up and down driver circuits 136 and 124 and the connection of the present invention to the existing vehicle circuitry is shown in FIG. 3.

Figure 3:
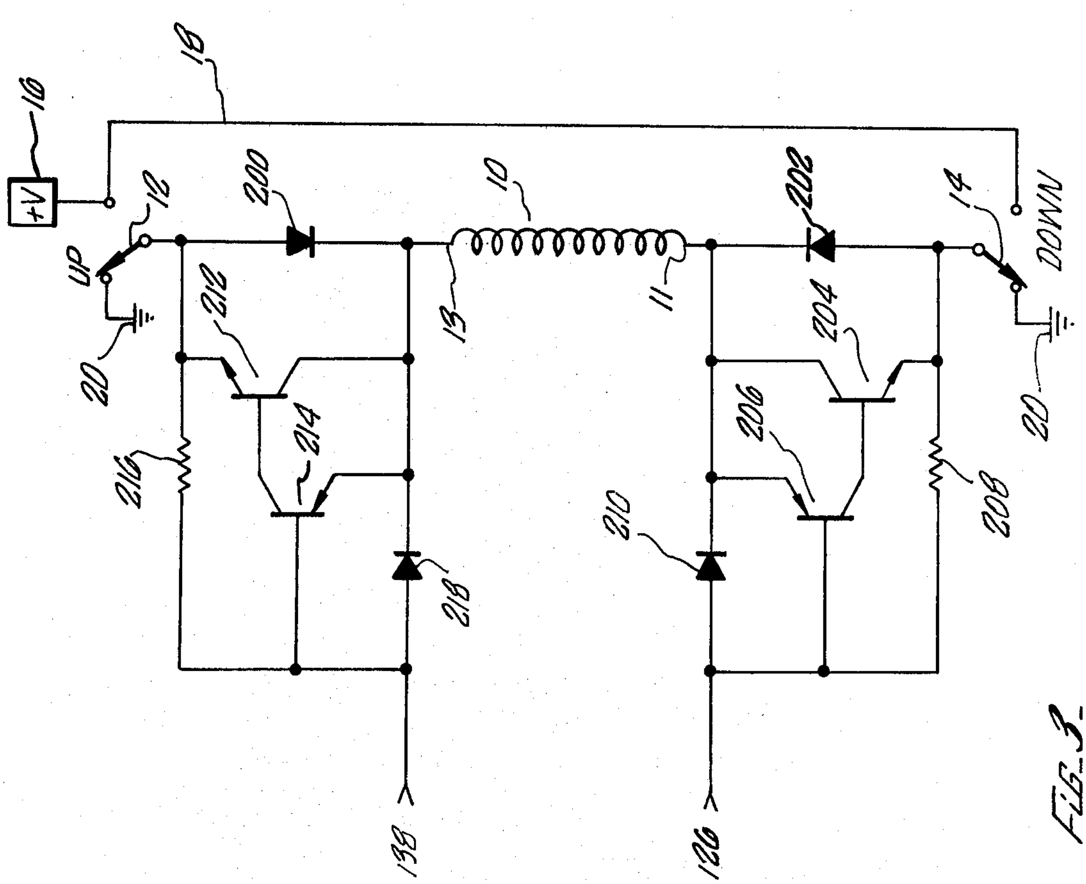
FIG. 3 is a schematic diagram of one embodiment of the invention depicted in FIG. 2, and how it interfaces to the existing vehicle window operating circuit.

In comparing FIG. 1 with FIG. 3, it can be seen that in FIG. 3, diodes 200 and 202 have been placed in series between the switches 12 and 14 and the ends 11 and 13 of the motor winding 10. When a voltage from the down driver circuit 124 of FIG. 2 appears on the line 126, it passes a current through a diode 210, and the motor winding 10 from end 11 to end 13. The Diode 200 is, however, reverse biased. The current from the motor winding 10 out of its end 13 passes through the collector emitter circuit of a transistor 212 to ground 20 via the switch 12. The Transistor 212 is turned on by the action of a transistor 214 and a resistor 216. There is zero voltage at the base of the transistor 214 because the output of the up driver circuit 136 through line 138 is zero volts; and thus transistor 214 is turned on. A diode 218 is reverse biased and prevents transistor 214 from being driven off by preventing current flow of sufficient magnitude through resistor 216.

The operation of remote raising of the window via the transistors 204, 206, resistor 208, diodes 210 and 218 and switch 14 is as described above since this portion of the circuit is a mirror to that which acts to lower the window.

Figure 4:
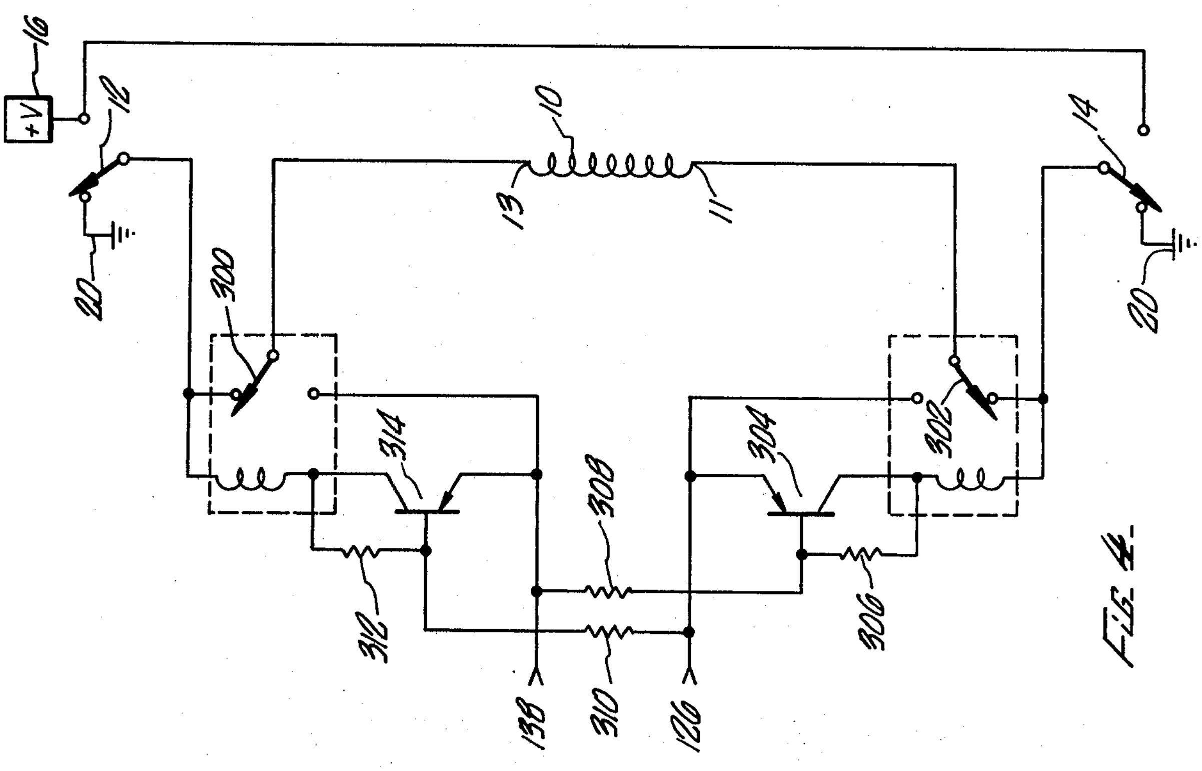
FIG. 4 is a schematic diagram of an alternate embodiment of the circuit depicted in FIG. 3.

FIG. 4 shows an alternative embodiment of the circuit of FIG. 3, utilizing electro-mechanical relays. Relays 300 and 302, shown inside dashed lines, each have a set of single pole double throw contacts. In normal operation, the contacts of the relays 300 and 302, via their wipers, connect the ends 11 and 12 of motor winding 10 as they would be in FIG. 1 without the circuitry of the present invention so that the windows may be operated normally from inside the vehicle. When the window is to be lowered remotely a voltage from the down driver circuit 124, via the line 126 appears between the emitter collector junction of transistor 304 and ground through the switch 14. Since the line 138 is at zero volts during a window lowering cycle, resistor 306 acts to bias the transistor 304 into conduction. This causes current to flow through the coil of the relay 302, energizing it and pulling its switch contact to connect the line 126 to the end 11 of the motor winding 10. There is a ground path for the current flowing through the motor winding 10 via the deactivated contacts of the relay 300 and the switch 12.

If the down cycle is interrupted prematurely, the signal in the line 126 will become zero and simultaneously voltage will appear in the line 138 causing the transistor 314 to be turned on and the relay current of the relay 300 to be energized in the same manner as described above for lowering the window. Relay 302 may not have had sufficient time to return to its normal state so voltage in the line 138 acts through the resistor 308 to turn a transistor 304 off and de-energize the relay 302 to reestablish current through switch 14. Current then flows through the motor winding 10 in a direction opposite to that which lowers the window, thus raising it.

The circuits herein disclosed may utilize circuit components chosen to withstand the voltages used in the particular vehicle with which the invention is to be used (usually 6 or 12 volts) and rated to withstand the current for which the particular window motor is rated. These requirements will vary from vehicle to vehicle and the component choices will be readily apparent to those of ordinary skill in the art. Those skilled in the art will also recognize that for vehicles employing positive ground systems, the roles of NPN and PNP transistors, as well as diode polarity, will need to be altered accordingly.

Those skilled in the art will recognize that other means of remotely transmitting a signal from a control unit to the vehicle, such as ultrasonic transducers may be used, without departing from the spirit of the invention.

While preferred embodiments of the invention have been disclosed, those skilled in the art will, from reading the above disclosure, recognize that variations in circuitry will operate effectively, and the scope of the present invention is meant to be limited only to the extent of the appended claims.

What I claim is:

1. Apparatus for controlling the raising and lowering of a motor vehicle window, comprising:

signal generating means for providing a single, manually-activated signal, remote from a vehicle, transmitting means located with said signal generating means for communicating said manually activated signal to a vehicle without the use of a physical connection between said signal generating means and said vehicle;

receiving means located in said vehicle for receiving said manually activated signal;

window controlling means responsive to said receiving means for activating a window motor in said vehicle in response to said manually-generated signal to raise or lower a window located in said vehicle, said window control means including a flip flop having an up driver output and a down driver output, an up driver circuit connected to said up driver output of said flip flop and a down driver circuit connected to said down driver output of said flip flop, and termination means for breaking the connection between said flip flop and said up driver circuit with termination of said manually-activated signal.

2. Apparatus according to claim 1 wherein said window controlling means further includes a timing means between said flip flop and said down driver circuit for providing a signal of predetermined duration to said down driver circuit upon activation of the down driver output of said flip flop.

3. Apparatus according to claim 2 wherein said window controlling means further includes a second termination means for terminating said timing means signal upon activation of said up driver output of said flip flop.

4. Apparatus according to claim 1 wherein said down driver circuit includes an electro-mechanical relay having a coil, and a transistor directing input power to said coil, said transistor being normally closed, the base of said transistor being connected to the input of said up driver circuit.

* * * * *